(12) United States Patent
Gao et al.

(10) Patent No.: US 9,992,115 B2
(45) Date of Patent: Jun. 5, 2018

(54) METHOD AND DEVICE FOR CONTROLLING TRAFFIC OF MOBILE ROUTER

(71) Applicant: Xiaomi Inc., Beijing (CN)

(72) Inventors: Sitai Gao, Beijing (CN); Mu Tang, Beijing (CN)

(73) Assignee: XIAOMI INC., Haidian District, Beijing ( * ) Notice: Subject to any disclaimer, the term of this patent is extended or adjusted under 35 U.S.C. 154(b) by 315 days.

(21) Appl. No.: 14/791,247

(22) Filed: Jul. 2, 2015

(65) Prior Publication Data

US 2016/0057059 A1 Feb. 25, 2016

Related U.S. Application Data

(63) Continuation of application No. PCT/CN2015/072045, filed on Jan. 30, 2015.

(30) Foreign Application Priority Data

Aug. 22, 2014 (CN) .......................... 2014 1 0418806

(51) Int. Cl.
| | |
|---|---|
| *H04L 12/801* | (2013.01) |
| *H04W 84/18* | (2009.01) |
| *G06F 3/0484* | (2013.01) |
| *G06F 3/0488* | (2013.01) |
| *H04M 1/725* | (2006.01) |

(52) U.S. Cl.
CPC .......... *H04L 47/10* (2013.01); *G06F 3/04847* (2013.01); *G06F 3/04883* (2013.01); *H04M 1/72563* (2013.01)

(58) Field of Classification Search
CPC ....... G06F 3/048; G06F 15/173; H04W 88/02
See application file for complete search history.

(56) References Cited

U.S. PATENT DOCUMENTS 5,063,372 A * 11/1991 Gillett .................. F25D 29/008
200/61.62
7,835,395 B2 * 11/2010 Okita .................. H04L 12/2854
370/231

(Continued)

FOREIGN PATENT DOCUMENTS

| CN | 101668352 A | 3/2010 |
|---|---|---|
| CN | 101854649 A | 10/2010 |

(Continued)

OTHER PUBLICATIONS

Office action from EPO for EP application 15182020.

(Continued)

*Primary Examiner* — Jennifer To
*Assistant Examiner* — Jasmine Wan
(74) *Attorney, Agent, or Firm* — Jun He Law Offices P.C.; James J. Zhu

(57) ABSTRACT

A method and a device for controlling traffic of a mobile router are provided. The method includes: generating a traffic control widget and displaying the traffic control widget on a control interface of the mobile router according to a total amount of traffic available to the mobile router; receiving a traffic operation on the traffic control widget; and limiting traffic of the mobile router according to the traffic operation.

7 Claims, 10 Drawing Sheets

(56) References Cited

U.S. PATENT DOCUMENTS

| | | | | |
|---|---|---|---|---|
| 9,032,077 B1* | 5/2015 | Klein | ............ | H04L 29/08 370/395.21 |
| 9,513,802 B2* | 12/2016 | Jang | ............ | G06F 3/0482 |
| 2002/0166063 A1* | 11/2002 | Lachman, III | ...... | H04L 63/0263 726/23 |
| 2006/0150692 A1* | 7/2006 | Chang | ............ | E05B 65/006 70/58 |
| 2009/0068984 A1 | 3/2009 | Burnett | | |
| 2009/0180430 A1 | 7/2009 | Fadell | | |
| 2010/0001967 A1* | 1/2010 | Yoo | ............ | G06F 3/0488 345/173 |
| 2010/0083167 A1* | 4/2010 | Kikuchi | ............ | G06F 1/1624 715/786 |
| 2011/0027644 A1 | 2/2011 | Kiyama | | |
| 2011/0074707 A1* | 3/2011 | Watanabe | ............ | G06F 3/03547 345/173 |
| 2012/0155296 A1 | 6/2012 | Kashanian | | |
| 2012/0157038 A1 | 6/2012 | Menezes | | |
| 2013/0093709 A1* | 4/2013 | Fujibayashi | ............ | G06F 3/04847 345/173 |
| 2013/0275877 A1 | 10/2013 | Varner et al. | | |
| 2013/0290709 A1 | 10/2013 | Muppidi | | |
| 2014/0359439 A1* | 12/2014 | Lyren | ............ | G06F 17/30864 715/705 |

FOREIGN PATENT DOCUMENTS

| | | |
|---|---|---|
| CN | 103209439 A | 7/2013 |
| CN | 104219714 A | 12/2014 |
| EP | 2391179 A1 | 11/2011 |
| JP | 2002111910 A | 4/2002 |
| KR | 20050052964 A | 6/2005 |
| WO | 2010128391 A2 | 11/2010 |

OTHER PUBLICATIONS

Office action from KIPO for KR application 2015-7021451.
Office action from JPO dated Oct. 25, 2016 for JP application 2016543314.
Office action from JPO dated Jun. 27, 2017 for JP application 2016543314.
Office action from SIPO for CN application 201410418806.
ISR and written opinion of PCT application.
Office action from RPO for RU application 2015135233.
"How to set data of Millet 2s (Internet disclosure)" (with translation), Baidu Jingyan, Jul. 18, 2013, http://jingyan.baidu.com/article/e52e3615b2c3bf40c60c5123.html, cited in Office action from SIPO for CN application 201410418806.

* cited by examiner

METHOD AND DEVICE FOR CONTROLLING TRAFFIC OF MOBILE ROUTER

CROSS-REFERENCE TO RELATED APPLICATION

The present application is a Continuation application of International Application No. PCT/CN2015/072045, filed with the State Intellectual Property Office of P. R. China on Jan. 30, 2015, which is based upon and claims priority to Chinese Patent Application No. 201410418806.2, filed on Aug. 22, 2014, the entirety contents of which are incorporated herein by reference.

TECHNICAL FIELD

The present disclosure relates to a technical field of mobile communication, and more particularly, to a method and a device for controlling traffic of a mobile router.

BACKGROUND

With the rapid development of communication technology, more and more users choose to use a mobile router to share Internet access. On one hand, like a mobile phone, the mobile router (such as a 3G/4G router or mobile hotspot) may be connected to a mobile data network of an operator, and on the other hand, the mobile router may convert the mobile data network into wireless signals (such as WiFi signals) in a local area network for users who cannot directly use a 3G/4G network in the local area network to use. A user joins the mobile data network after connecting to the mobile router, and thus the convenience of surfing the mobile data network may be shared together.

Currently, the billing of the mobile data network is charged according to data usage, therefore, a traffic control of the mobile router by a manager of the mobile router is exceptionally important. For example, in one scenario, the manager sometimes accesses the Internet alone using the mobile router, sometimes allows other users to using the mobile router for surfing the web together. However, the manager might not wish the other users to use up too many traffic when the other users share his/her own mobile router, thus the manager may want to control the traffic of the mobile router in a timely manner. However, there is no simple and quick traffic control method for a mobile router in the related art to satisfy the manager's requirement for controlling the traffic of the mobile router in time.

SUMMARY

According to a first aspect of embodiments of the present disclosure, a method for controlling traffic of a mobile router is provided. The method includes: generating a traffic control widget; displaying the traffic control widget on a control interface of the mobile router according to a total amount of traffic available to the mobile router; receiving a traffic operation on the traffic control widget; and limiting traffic of the mobile router according to the traffic operation.

According to a second aspect of embodiments of the present disclosure, a device for controlling traffic of a mobile router is provided. The device includes: a processor; a memory configured to store instructions executable by the processor. In this case, the processor is configured to: generate a traffic control widget; display the traffic control widget on a control interface of the mobile router according to a total amount of traffic available to the mobile router; receive a traffic operation on the traffic control widget; and limit traffic of the mobile router according to the traffic operation.

According to a third aspect of embodiments of the present disclosure, a non-transitory computer-readable storage medium is provided. The non-transitory computer-readable storage medium have stored therein instructions that, when executed by a processor of a device, causes the device to perform a method for controlling traffic of a mobile router, the method includes: generating a traffic control widget; displaying the traffic control widget on a control interface of the mobile router according to a total amount of traffic available to the mobile router; receiving a traffic operation on the traffic control widget; and limiting traffic of the mobile router according to the traffic operation.

It shall be appreciated that the above general description and the detailed description hereinafter are only illustrative but not for limiting the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
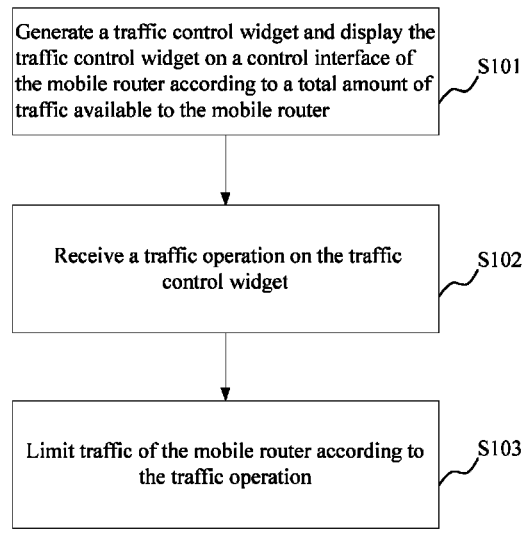
FIG. 1 is a flow chart illustrating a method for controlling traffic of a mobile router according to an exemplary embodiment of the present disclosure.

FIG. 1 is a flow chart illustrating a method for controlling traffic of a mobile router according to an exemplary embodiment of the present disclosure.

In step S101, a traffic control widget is generated and the traffic control widget is displayed on a control interface of the mobile router according to a total amount of traffic available to the mobile router.

For example, similar to a terminal device such as a mobile phone, usually a data traffic plan may be purchased and set in the mobile router, for example 800 M (in other words, 800 M bits. "M" represents "M bits" in the following text.) per month. That is, in this month, the total traffic available to the mobile router is 800 M.

Usually, the mobile router has a simple operating system. The mobile router may be logged in using a terminal device (such as a mobile phone, a tablet computer or a PC (personal computer)). The mobile router may be set through an operating interface of the operating system of the mobile router. Moreover, an APP (application) for operating the mobile router may be set up on the terminal device (such as a mobile phone). An operating interface of the APP is the operating interface of the mobile router. If it is necessary to set the mobile router, the APP on the mobile phone may be initiated directly.

After obtaining the total traffic available to the mobile router, the traffic control widget may be generated according to the total traffic. The traffic control widget may limit the mobile router by defining the total traffic as a maximum traffic and adjust an amount of current available traffic of the mobile router. A specific type of the traffic control widget is not limited in this embodiment. For example, the traffic control widget may be constructed of a strip-shaped traffic bar and a slider-shaped traffic lock on the traffic bar, and an amount of locked traffic may be adjusted by sliding the traffic lock. For another example, the traffic control widget may be a type of dial wheel, and the amount of the locked traffic may be adjusted by dialing the dial wheel (similar to dialing a dial wheel so as to adjust a date). For another example, the traffic bar may be a type of dial with a needle, and a percentage of the locked traffic in the total traffic may be adjusted by dialing the needle on the dial. For another example, the traffic control widget even may be a simple edit box, and the value of the locked traffic is input in the edit box, etc.

In step S102, a traffic operation on the traffic control widget is received.

The traffic operation is a traffic control operation. After the traffic control widget is displayed on the control interface, a user may perform the traffic operation on the traffic control widget using a touch screen or a keyboard.

In step S103, traffic of the mobile router is limited according to the traffic operation.

For example, assuming that the total traffic is 800 M, current remaining traffic is 700 M, and 300 M of traffic is locked by operating the traffic control widget by the user, when the mobile router is used in future, if only 300 M of traffic is remaining, the usage of the data network is stopped, that is, the traffic is locked at 300 M.

In this embodiment, the traffic control widget may be generated according to the total traffic available to the mobile router for the user to operate on the control interface of the mobile router, and a limit of the traffic of the mobile router may be implemented within the total traffic. For example, the traffic control widget may be the traffic bar with the traffic lock. The amount of the locked traffic may be adjusted by sliding the traffic lock on the traffic bar, such that a timely control of the traffic of the mobile router may be implemented simply and quickly.

Figure 2:
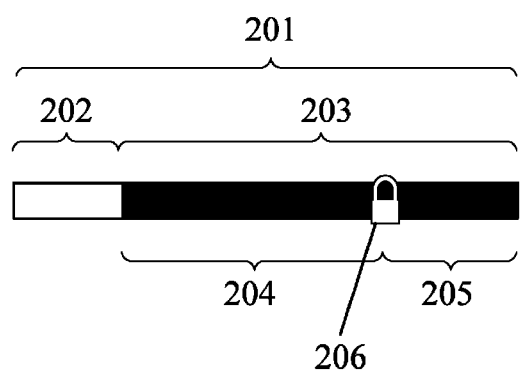
FIG. 2 is a schematic diagram illustrating a traffic control widget according to an exemplary embodiment of the present disclosure.

FIG. 2 is a schematic diagram illustrating a traffic control widget according to an exemplary embodiment of the present disclosure.

In this embodiment, the traffic control widget may include the traffic bar and the traffic lock capable of sliding on the traffic bar. A length of the traffic bar is determined according to the total traffic, and the traffic lock is configured to divide traffic represented by the traffic bar into locked traffic and available traffic. The traffic represented by the traffic bar is current unused traffic. The current unused traffic may be further divided into locked traffic and available traffic. The locked traffic and the available traffic are separated by the traffic lock.

Referring to FIG. 2, FIG. 2 shows the traffic bar 201, which also represents the total traffic. The traffic lock 206 is capable of sliding left and right along the traffic bar. The locked traffic 205 is divided by the traffic lock. The current used traffic 202 and the current unused traffic 203 are both shown on the traffic bar. The available traffic 204 is in the current unused traffic 203. The available traffic 204 and the locked traffic 205 constitute the current unused traffic 203. The current unused traffic 203 and the current used traffic 202 constitute the total traffic 201.

Additionally, in FIG. 2, the traffic lock is designed as a lock-shaped icon. In other scenarios, the traffic lock may be another icon, such as a rectangular slider, etc.

Figure 3:
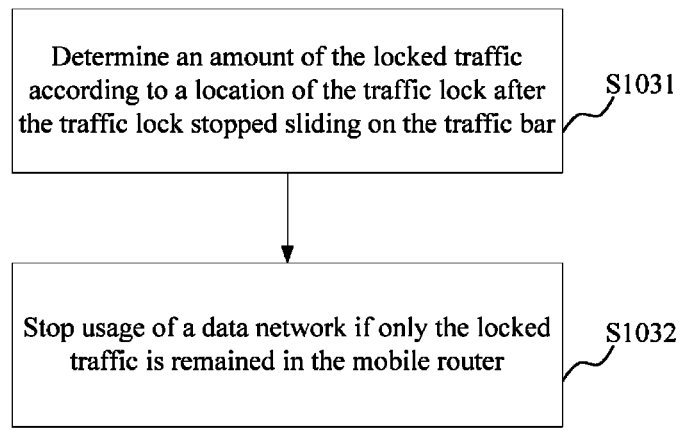
FIG. 3 is a flow chart illustrating a method for controlling traffic of a mobile router according to an exemplary embodiment of the present disclosure.

In this embodiment or other embodiments of the present disclosure, referring to FIG. 3, the traffic of the mobile router may be limited according to the traffic operation, including following steps.

In step S1031, an amount of the locked traffic is determined according to a location of the traffic lock after the traffic lock stops sliding on the traffic bar.

In step S1032, usage of a data network is stopped if only the locked traffic is remained.

Take FIG. 2 as an example, as data continues to pass through the mobile router, a current used traffic 202 increases gradually. Accordingly, a length of the current unused traffic 203 decreases gradually. The user may slide the traffic lock on the traffic bar randomly to set the value of the locked traffic 205. Of course, it is easy to understand that, if the user slides the traffic lock in a range of the current used traffic 202, a biggest value of the locked traffic 205 is the value of the current unused traffic 203.

Figure 4:
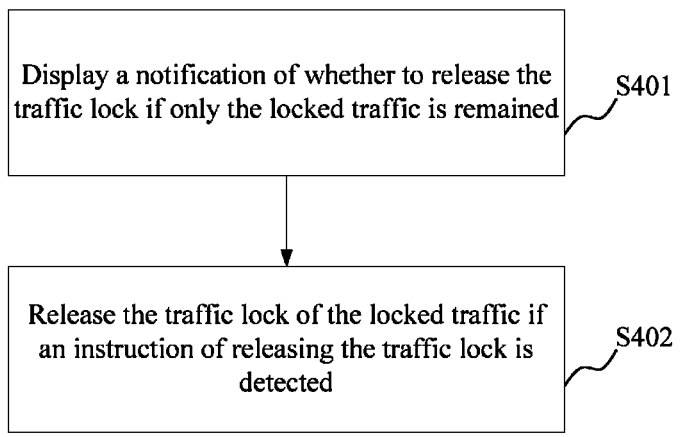
FIG. 4 is a flow chart illustrating a method for controlling traffic of a mobile router according to an exemplary embodiment of the present disclosure.

Additionally, referring to FIG. 4, in this embodiment and other embodiments of the present disclosure, the method may further include following steps.

In step S401, a notification indicating whether to release the traffic lock is displayed if only the locked traffic is remained.

In step S402, the traffic lock of the locked traffic is released if an instruction of releasing the traffic lock is detected.

In this way, if the user changes his/her mind and does not want to limit the traffic, the traffic lock of the locked traffic may be released.

Additionally, in this embodiment and other embodiments of the present disclosure, the available traffic and the locked traffic are displayed in real time according to a change in a location of the traffic lock when the traffic lock is sliding on the traffic bar.

In order to be convenient for the user to obtain details of the traffic lock directly, the available traffic and the locked traffic may be displayed in real time according to the change in the location of the traffic lock. The specific value of the locked traffic may be obtained by multiplying a percentage of a length of the locked traffic in the length of the traffic bar by the total traffic.

Additionally, in this embodiment and other embodiments of the present disclosure, used traffic and unused traffic are displayed on the traffic bar in different modes.

Take FIG. 2 as an example, in FIG. 2, in order to be convenient to distinguish the current used traffic from the current unused traffic, the current used traffic 202 is displayed using white color, and the current unused traffic 203 is displayed using black color.

In this embodiment, the traffic control widget may be generated according to the total traffic available to the mobile router for the user to perform an operation on the control interface of the mobile router, and a limit of the traffic of the mobile router may be implemented within the total traffic. For example, the traffic control widget may be the traffic bar with the traffic lock, and the amount of the locked traffic may be adjusted by sliding the traffic lock on the traffic bar, such that a timely control of the traffic of the mobile router may be implemented simply and quickly.

Figure 5:
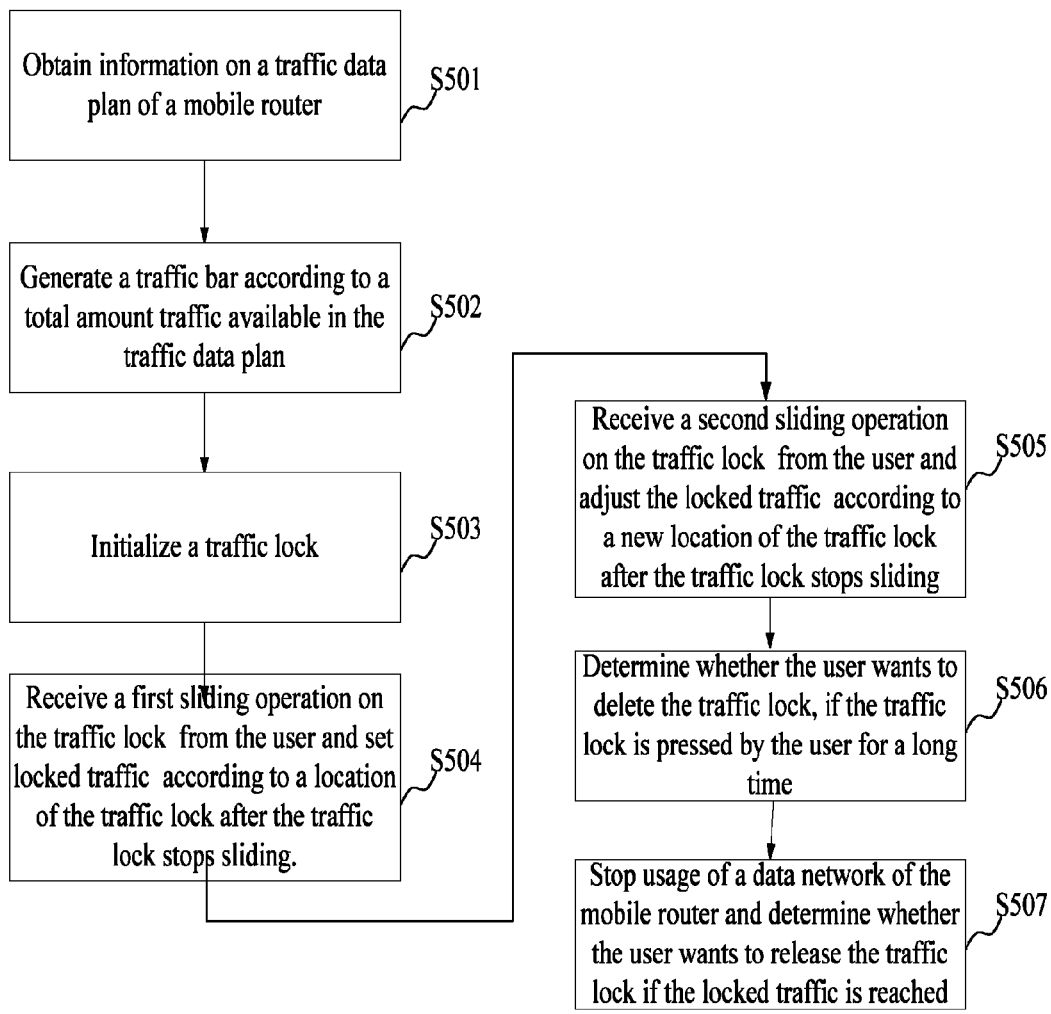
FIG. 5 is a flow chart illustrating a method for controlling traffic of a mobile router according to an exemplary embodiment of the present disclosure.

In the following, referring to FIG. 5, a solution of the present disclosure is further described with reference to a specific example.

In step S501, information on a traffic data plan of a mobile router is obtained.

The information of a traffic data plan ordered by the mobile router may be inputted by the user manually, or may be obtained from an operator of an operating system of the mobile router or an APP for operating the mobile router on a mobile phone.

In step S502, a traffic bar is generated according to the total amount traffic available in the traffic data plan.

A value of the total traffic and a value of current remaining traffic may be further displayed on the interface.

In step S503, a traffic lock is initialized.

Since traffic is not limited by the user when the traffic lock is initialized, the traffic lock may be located at a zero location at a rightmost end of the traffic bar.

In step S504, a first sliding operation on the traffic lock is received from the user and locked traffic is set according to a location of the traffic lock after the traffic lock stops sliding.

For example, one day, 654.6 M of traffic in the 800 M of traffic is left. Considering that the traffic cannot be used in a short time, it is necessary to make prudent use of the traffic. Thus, the traffic lock is slid and 100 M of traffic in the current remaining traffic is locked.

Figure 6:
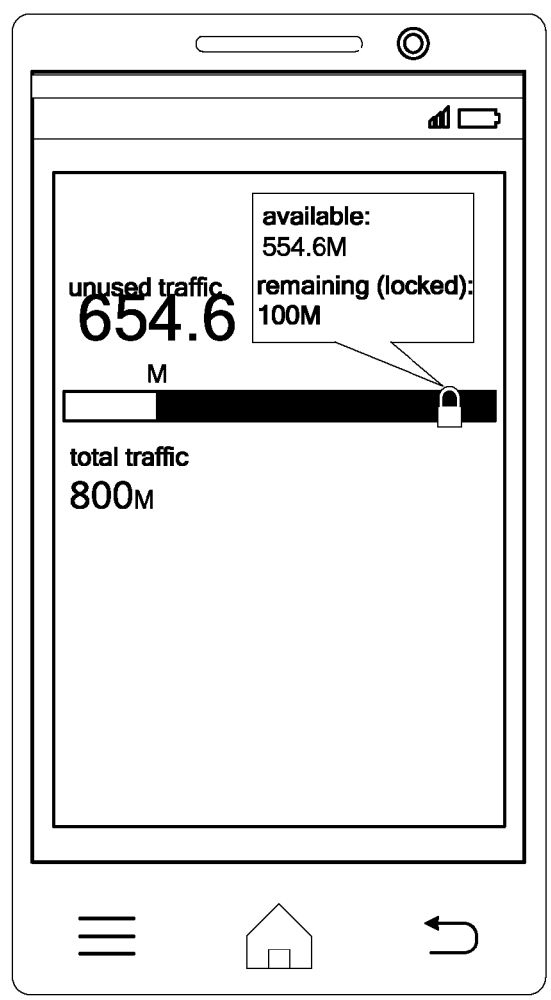
FIG. 6 is a schematic diagram illustrating a location of a traffic lock according to an exemplary embodiment of the present disclosure.

Referring to FIG. 6, the user sets the traffic lock at a location of "remaining (locked) 100 M", that is, the traffic is locked if only 100 M of traffic is remaining Thus, currently, 554.6 M out of 654.6 M of traffic is available.

In step S505, a second sliding operation on the traffic lock is received from the user and the locked traffic is adjusted according to a new location of the traffic lock after the traffic lock stops sliding.

For example, in another day, the mobile router is shared by the user with his/her friends. In order to keep his/her own traffic, the user may slide the traffic lock to the left. In other words, a range of the locked traffic is expanded.

Figure 7:
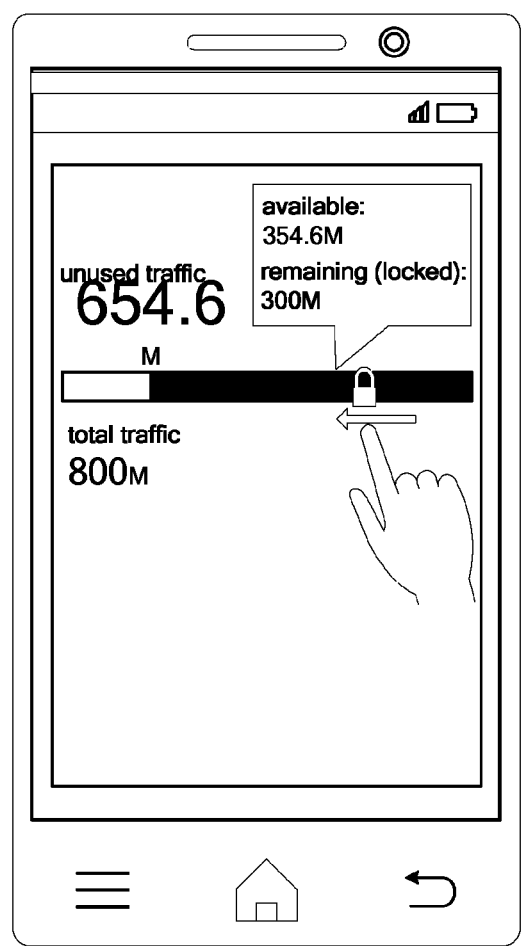
FIG. 7 is a schematic diagram illustrating a movement of a traffic lock according to an exemplary embodiment of the present disclosure.

Referring to FIG. 7, the traffic lock is slid from a location of "remaining (locked) 100 M" to a location of "remaining (locked) 300 M".

In step S506, it is determined whether the user wants to delete the traffic lock, if the traffic lock is pressed by the user for a long time.

Figure 8:
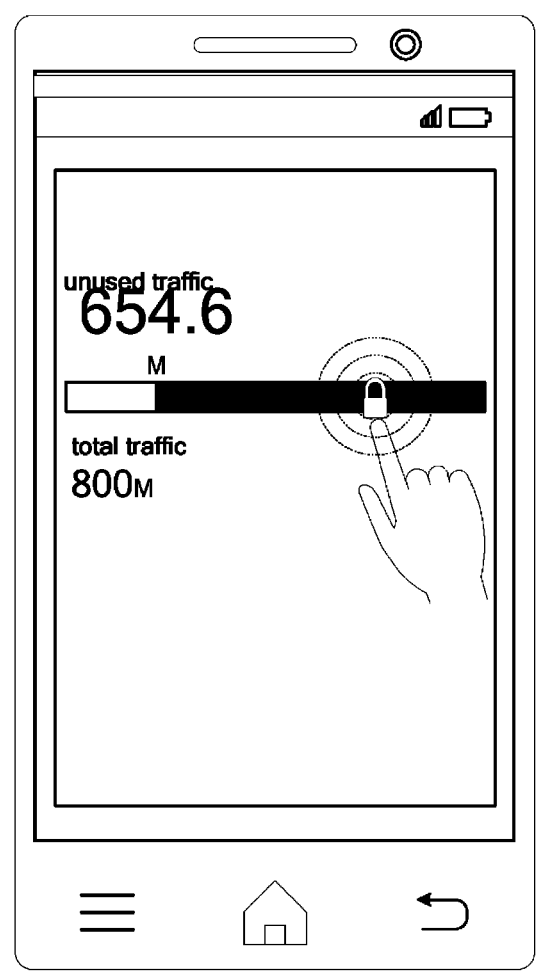
FIG. 8 is a schematic diagram illustrating that a traffic lock is pressed for a long time according to an embodiment of the present disclosure.

Before the traffic is locked, the user may press the traffic lock for a long time (referring to FIG. 8) if the user wants to release the traffic lock set previously. Then, a notification is displayed on the interface, querying whether the user wants to delete the traffic lock.

In step S507, usage of a data network of the mobile router is stopped and it is determined whether the user wants to release the traffic lock if the locked traffic is reached.

Figure 9:
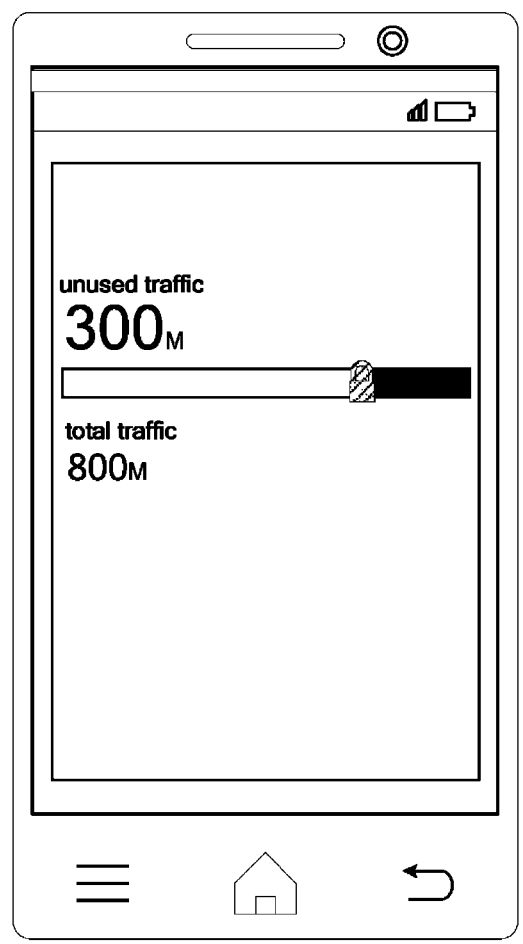
FIG. 9 is a schematic diagram illustrating that a traffic lock is activated according to an exemplary embodiment of the present disclosure.
Figure 10:
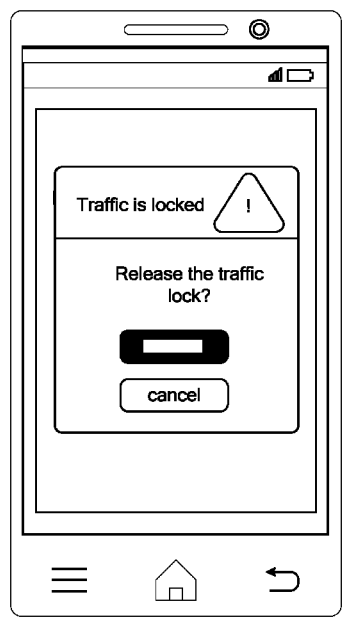
FIG. 10 is a schematic diagram illustrating a notification indicating releasing a traffic lock according to an exemplary embodiment of the present disclosure.

With the use of the traffic, only 100 M of traffic is left one day. That is, the locked traffic is reached, and the traffic lock is activated, as shown in FIG. 9. At this time, the use of the data network of the mobile router is stopped. That is, the traffic is stopped. At the same time, a notification illustrated in FIG. 10 may be displayed, querying whether the user wants to release the traffic lock. If the user chooses to press a "release" button, an instruction of releasing the traffic lock is triggered, such that the traffic lock is released.

In this embodiment, the traffic control widget may be generated according to the total traffic available to the mobile router for the user to perform an operation on the control interface of the mobile router, and a limit of the traffic of the mobile router may be implemented within the total traffic. For example, the traffic control widget may be the traffic bar with the traffic lock, and the amount of the locked traffic may be adjusted by sliding the traffic lock on the traffic bar, such that a timely control of the traffic of the mobile router may be implemented simply and quickly.

Figure 11:
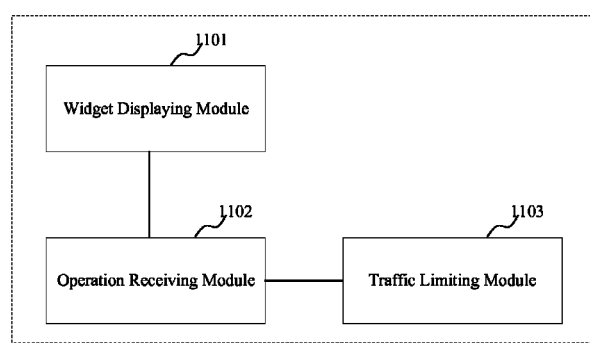
FIG. 11 is a block diagram illustrating an apparatus for controlling traffic of a mobile router according to an exemplary embodiment of the present disclosure.

FIG. 11 is a block diagram illustrating an apparatus for controlling traffic of a mobile router according to an exemplary embodiment of the present disclosure. The apparatus may include: a widget displaying module 1101, configured to generate a traffic control widget and display the traffic control widget on a control interface of the mobile router according to a total amount of traffic available to the mobile router; an operation receiving module 1102, configured to receive a traffic operation on the traffic control widget; a traffic limiting module 1103, configured to limit traffic of the mobile router according to the traffic operation.

In this embodiment or other embodiments of the present disclosure, the traffic control widget includes a traffic bar and a traffic lock capable of sliding on the traffic bar, in which a length of the traffic bar is determined according to the total traffic, and the traffic lock is configured to divide traffic represented by the traffic bar into locked traffic and available traffic.

Figure 12:
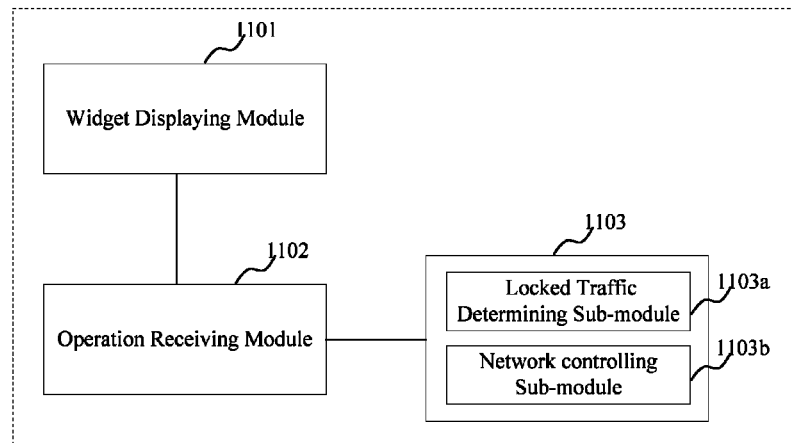
FIG. 12 is a block diagram illustrating an apparatus for controlling traffic of a mobile router according to an exemplary embodiment of the present disclosure.

Referring to FIG. 12, in this embodiment or other embodiments of the present disclosure, the traffic limiting module 1103 may include: a locked traffic determining sub-module 1103a, configured to determine an amount of the locked traffic according to a location of the traffic lock after the traffic lock stops sliding on the traffic bar; a network controlling sub-module 1103b, configured to stop usage of a data network if only the locked traffic is remained.

Figure 13:
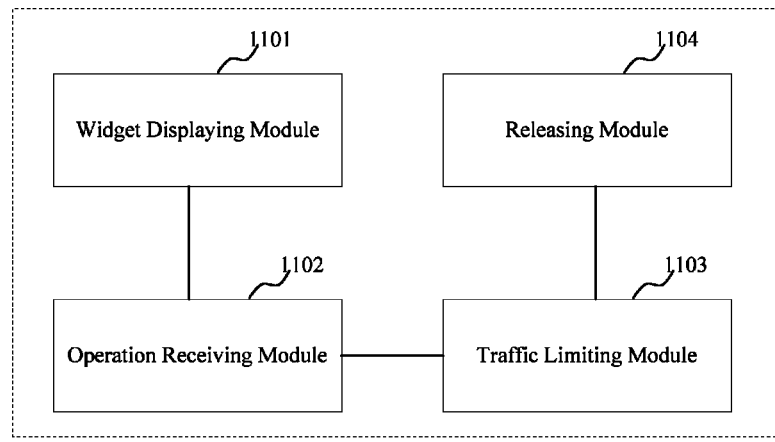
FIG. 13 is a block diagram illustrating an apparatus for controlling traffic of a mobile router according to an exemplary embodiment of the present disclosure.

Additionally, referring to FIG. 13, in this embodiment or other embodiments of the present disclosure, the traffic control apparatus may further include: a releasing module 1104, configured to display a notification indicating whether to release the traffic lock if only the locked traffic is left and to release the traffic lock of the locked traffic if an instruction of releasing the traffic lock is detected.

In embodiments of the present disclosure, the traffic control widget may be generated according to the total traffic available to the mobile router for a user to perform an operation on the control interface of the mobile router, and a limit of the traffic of the mobile router may be implemented within the total traffic. For example, the traffic control widget may be the traffic bar with the traffic lock, and the amount of the locked traffic may be adjusted by sliding the traffic lock on the traffic bar, such that a timely control of the traffic of the mobile router may be implemented simply and quickly.

With respect to the apparatuses in above embodiments, the specific manners for performing operations for individual modules therein have been described in detail in the embodiments regarding the methods, which are not elaborated herein again.

In embodiments of the present disclosure, there is also provided a non-transitory computer-readable storage medium having stored therein instructions that, when executed by a processor of a device, causes the device to perform a method for controlling traffic of a mobile router. The method includes: generating a traffic control widget and displaying the traffic control widget on a control interface of the mobile router according to a total mount of traffic available to the mobile router; receiving a traffic operation on the traffic control widget; and limiting traffic of the mobile router according to the traffic operation.

Figure 14:
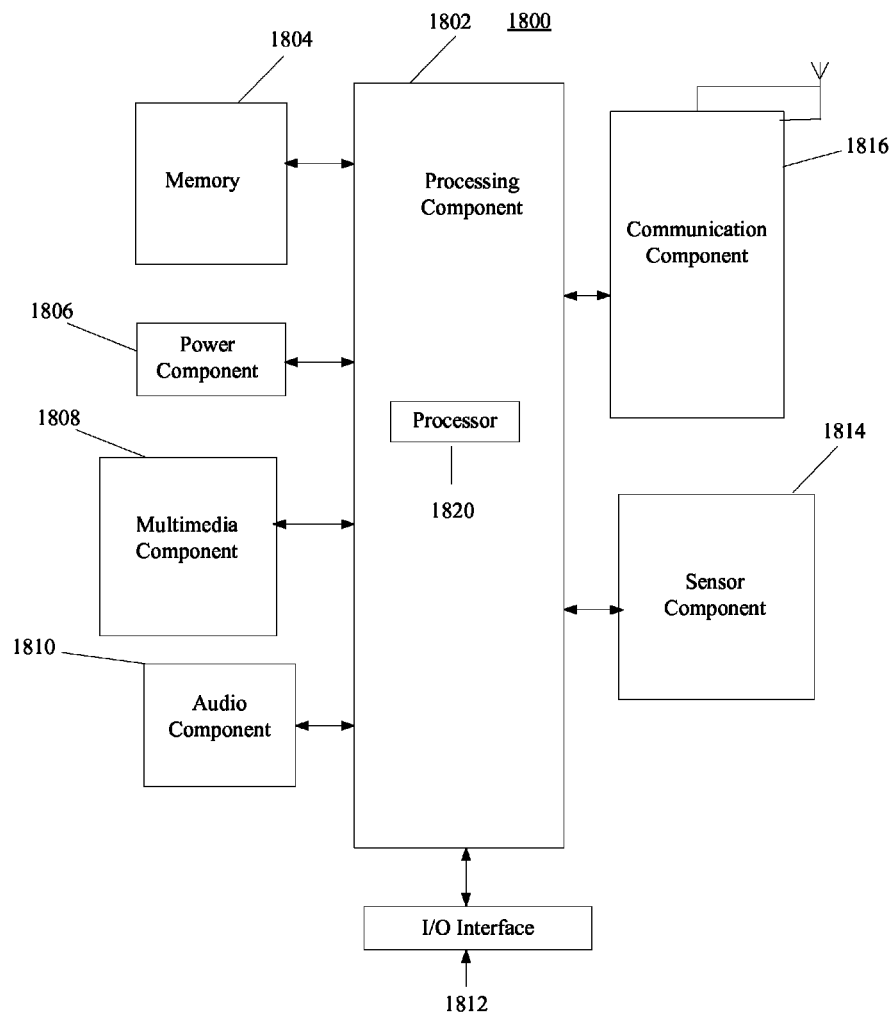
FIG. 14 is a block diagram illustrating a device for controlling traffic of a mobile router according to an exemplary embodiment of the present disclosure.

FIG. 14 is a block diagram of a mobile router according to an exemplary embodiment of the present disclosure. For example, the device 1800 may be a mobile phone, a computer, a digital broadcasting terminal, a message receiving and sending equipment, a game controller, a tablet device, a medical equipment, a fitness equipment, a PDA and so on.

Referring to FIG. 14, the device 1800 may include one or more of the following components: a processing component 1802, a memory 1804, a power component 1806, a multimedia component 1808, an audio component 1810, an input/output (I/O) interface 1812, a sensor component 1814, and a communication component 1816.

The processing component 1802 typically controls overall operations of the device 1800, such as the operations associated with display, telephone calls, data communications, camera operations, and recording operations. The processing component 1802 may include one or more processors 1820 to execute instructions so as to perform all or part of the steps in the above described methods. Moreover, the processing component 1802 may include one or more modules which facilitate the interaction between the processing component 1802 and other components. For instance, the processing component 1802 may include a multimedia module to facilitate the interaction between the multimedia component 1808 and the processing component 1802.

The memory 1804 is configured to store various types of data to support the operation of the device 1800. Examples of such data include instructions for any applications or methods operated on the device 1800, contact data, phonebook data, messages, pictures, videos, etc. The memory 1804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1806 provides power to various components of the device 1800. The power component 1806 may include a power management system, one or more power sources, and any other components associated with the generation, management, and distribution of power in the device 1800.

The multimedia component 1808 includes a screen providing an output interface between the device 1800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 1808 includes a front camera and/or a rear camera. The front camera and/or the rear camera may receive external multimedia data while the device 1800 is in an operation mode, such as a photographing mode or a video mode. Each of the front camera and the rear camera may be a fixed optical lens system, or have focus and optical zoom capability.

The audio component 1810 is configured to output and/or input an audio signal. For example, the audio component 1810 includes a microphone ("MIC") configured to receive an external audio signal when the device 1800 is in an operation mode, such as a call mode, a recording mode, and a voice recognition mode. The received audio signal may be further stored in the memory 1804 or transmitted via the communication component 1816. In some embodiments, the audio component 1810 further includes a speaker to output audio signals.

The I/O interface 1812 provides an interface between the processing component 1802 and a peripheral interface module, such as a keyboard, a click wheel, a button, and the like. The button may include, but are not limited to, a home button, a volume button, a starting button, and a locking button.

The sensor component 1814 includes one or more sensors to provide status assessments of various aspects of the device 1800. For instance, the sensor component 1814 may detect an on/off status of the device 1800, relative position of a component (e.g., the display and the keypad) of the device 1800, a change in position of the device 1800 or a component of the device 1800, a presence or absence of user contact with the device 1800, an orientation or an acceleration/deceleration of the device 1800, and a change in temperature of the device 1800. The sensor component 1814 may include a proximity sensor configured to detect the presence of nearby objects without any physical contact. The sensor component 1814 may also include a light sensor, such as a CMOS or CCD image sensor, for use in imaging applications. In some embodiments, the sensor component 1814 may also include an accelerometer sensor, a gyroscope sensor, a magnetic sensor, a pressure sensor, or a temperature sensor.

The communication component 1816 is configured to facilitate wired or wireless communication between the device 1800 and other devices. The device 1800 can access a wireless network based on a communication standard, such as a WIFI network, a 2G network, or a 3G network, or a combination thereof. In one exemplary embodiment, the communication component 1816 receives a broadcast signal or broadcast associated information from an external broadcast management system via a broadcast channel. In one exemplary embodiment, the communication component 1816 further includes a near field communication (NFC) module to facilitate short-range communications. For example, the NFC module may be implemented based on a technology such as radio frequency identification (RFID) technology, infrared data association (IrDA) technology, ultra-wideband (UWB) technology, Bluetooth (BT) technology, and other technologies.

In exemplary embodiments, the device 1800 may be implemented with at least one device selected from a group consisting of an application specific integrated circuit (ASIC), a digital signal processor (DSP), a digital signal processing device (DSPD), a programmable logic device (PLD), a field programmable gate arrays (FPGA), a controller, a micro-controller, a microprocessor, or other electronic components, for performing the above described methods according to embodiments of the present disclosure.

In exemplary embodiments, there is also provided a non-transitory computer-readable storage medium including instructions, such as the memory 1804 including instructions, and the instructions are executable by the processor 1820 of the device 1800, for performing the above-described methods. For example, the non-transitory computer-readable storage medium may be a ROM, a random access memory (RAM), a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling traffic of a mobile router, comprising:
   generating a traffic control widget, wherein the traffic control widget comprises a traffic bar and a traffic lock capable of sliding on the traffic bar;
   displaying the traffic control widget on a control interface of the mobile router according to a total amount of traffic available to the mobile router, wherein the total amount of traffic is the amount of data purchased and set for the mobile router, a length of the traffic bar is determined according to the total amount of traffic, and the traffic lock is configured to divide traffic represented by the traffic bar into locked traffic and available traffic;
   receiving a traffic operation on the traffic control widget, wherein the traffic operation is configured to implement a limit to an amount of current available traffic within the total amount of traffic;
   limiting the amount of current available traffic of the mobile router according to the traffic operation, wherein limiting the amount of current available traffic of the mobile router according to the traffic operation comprises: determining an amount of the locked traffic according to a location of the traffic lock after the traffic lock stopped sliding on the traffic bar, and stopping usage of a data network if only the locked traffic is remained in the mobile router;
   displaying a notification of whether to release the traffic lock if only the locked traffic is remained; and
   releasing the traffic lock of the locked traffic if an instruction of releasing the traffic lock is detected.

2. The method according to claim 1, wherein the available traffic and the locked traffic are displayed in real time according to a change in a location of the traffic lock when the traffic lock is sliding on the traffic bar.

3. The method according to claim 2, wherein used traffic and unused traffic are displayed on the traffic bar in different modes.

4. A device for controlling traffic of a mobile router, comprising:
   a processor;
   a memory configured to store instructions executable by the processor;
   wherein the processor is configured to perform:
   generating a traffic control widget, wherein the traffic control widget comprises a traffic bar and a traffic lock capable of sliding on the traffic bar;
   displaying the traffic control widget on a control interface of the mobile router according to a total amount of traffic available to the mobile router, wherein the total amount of traffic is the amount of data purchased and set for the mobile router, a length of the traffic bar is determined according to the total amount of traffic, and the traffic lock is configured to divide traffic represented by the traffic bar into locked traffic and available traffic;
   receiving a traffic operation on the traffic control widget, wherein the traffic operation is configured to implement a limit to an amount of current available traffic within the total amount of traffic;
   limiting the amount of current available traffic of the mobile router according to the traffic operation, wherein limiting the amount of current available traffic of the mobile router according to the traffic operation comprises: determining an amount of the locked traffic according to a location of the traffic lock after the traffic lock stopped sliding on the traffic bar, and stopping usage of a data network if only the locked traffic is remained in the mobile router;
   displaying a notification of whether to release the traffic lock if only the locked traffic is remained; and
   releasing the traffic lock of the locked traffic if an instruction of releasing the traffic lock is detected.

5. The device according to claim 4, wherein the available traffic and the locked traffic are displayed in real time according to a change in a location of the traffic lock when the traffic lock is sliding on the traffic bar.

6. The device according to claim 5, wherein used traffic and unused traffic are displayed on the traffic bar in different modes.

7. A non-transitory computer-readable storage medium having stored therein instructions that, when executed by a processor of a device, causes the device to perform a method for controlling traffic of a mobile router, the method comprising:

generating a traffic control widget, wherein the traffic control widget comprises a traffic bar and a traffic lock capable of sliding on the traffic bar;

displaying the traffic control widget on a control interface of the mobile router according to a total amount of traffic available to the mobile router, wherein the total amount of traffic is the amount of data purchased and set for the mobile router, a length of the traffic bar is determined according to the total amount of traffic, and the traffic lock is configured to divide traffic represented by the traffic bar into locked traffic and available traffic;

receiving a traffic operation on the traffic control widget, wherein the traffic operation is configured to implement a limit to an amount of current available traffic within the total amount of traffic;

limiting the amount of current available traffic of the mobile router according to the traffic operation, wherein limiting the amount of current available traffic of the mobile router according to the traffic operation comprises: determining an amount of the locked traffic according to a location of the traffic lock after the traffic lock stopped sliding on the traffic bar, and stopping usage of a data network if only the locked traffic is remained in the mobile router;

displaying a notification of whether to release the traffic lock if only the locked traffic is remained; and releasing the traffic lock of the locked traffic if an instruction of releasing the traffic lock is detected.

* * * * *